(12) United States Patent
Brehon et al.

(10) Patent No.: US 8,514,850 B2
(45) Date of Patent: Aug. 20, 2013

(54) METHOD FOR ESTABLISHING A BIDIRECTIONAL POINT-TO-POINT CONNECTION

(75) Inventors: Yannick Brehon, Paris (FR); Laurent Ciavaglia, Montrouge (FR)

(73) Assignee: Alcatel Lucent, Paris (FR)

( * ) Notice: Subject to any disclaimer, the term of this patent is extended or adjusted under 35 U.S.C. 154(b) by 236 days.

(21) Appl. No.: 12/201,372

(22) Filed: Aug. 29, 2008

(65) Prior Publication Data
US 2009/0077237 A1 Mar. 19, 2009

(30) Foreign Application Priority Data
Sep. 3, 2007 (FR) ...................................... 07 57329

(51) Int. Cl.
*H04L 12/50* (2006.01)
*H04Q 11/00* (2006.01)

(52) U.S. Cl.
USPC ... 370/360; 370/389; 370/395.5; 370/395.53; 370/408

(58) Field of Classification Search
USPC .................. 370/360, 389, 395.5, 395.53, 408
See application file for complete search history.

(56) References Cited

U.S. PATENT DOCUMENTS

| | | | |
|---|---|---|---|
| 6,519,254 B1 * | 2/2003 | Chuah et al. .................. | 370/389 |
| 6,985,447 B2 * | 1/2006 | Gibson et al. ................. | 370/255 |
| 7,532,633 B2 * | 5/2009 | Rijsman ........................ | 370/401 |
| 7,564,803 B1 * | 7/2009 | Minei et al. ................... | 370/254 |
| 7,650,637 B2 * | 1/2010 | Li et al. ........................... | 726/15 |
| 2002/0176415 A1 * | 11/2002 | Holden et al. ................ | 370/389 |
| 2003/0023573 A1 * | 1/2003 | Chan et al. .................... | 706/47 |
| 2003/0145105 A1 * | 7/2003 | Desineni et al. .............. | 709/238 |
| 2003/0210705 A1 * | 11/2003 | Seddigh et al. ............... | 370/419 |
| 2003/0227871 A1 * | 12/2003 | Hsu et al. ...................... | 370/230 |
| 2005/0105905 A1 * | 5/2005 | Ovadia et al. ................... | 398/47 |
| 2006/0221816 A1 * | 10/2006 | Nagata et al. ................. | 370/216 |
| 2007/0177525 A1 * | 8/2007 | Wijnands et al. ............. | 370/254 |
| 2008/0189426 A1 * | 8/2008 | Xu ................................. | 709/227 |
| 2008/0212496 A1 * | 9/2008 | Zou .............................. | 370/255 |
| 2009/0016341 A1 * | 1/2009 | Huang et al. .................. | 370/389 |
| 2009/0077237 A1 * | 3/2009 | Brehon et al. ................. | 709/226 |

OTHER PUBLICATIONS

Request for Comment 4875, "Extensions to Resource Reservation Protocol—Traffic Engineering (RSVP-TE) for Point-to-Multipoint TE Label Switching Paths (LSPs)"; Aggrawal et al; Juniper networks; Alacatel; May 2007.*

"Supporting Multipoint-to-Point Label Switched Paths in Multiprotocol Label Switching Traffic Engineering"; Yasukawa; Aug. 2007; draft-yasukawa-mpls-mp2p-rsvpte-03.txt; http://tools.ietf.org/pdf/draft-yasukawa-mpls-mp2p-rsvpte-03; 21 pages.*

* cited by examiner

*Primary Examiner* — Benjamin H Elliott, IV
(74) *Attorney, Agent, or Firm* — Sughrue Mion PLLC

(57) ABSTRACT

A communication device (S) for an MPLS network comprises a signaling module capable of establishing a point-to-multipoint MPLS connection tree with a plurality of leaf nodes (A, B) by transmitting a connection request message and by receiving a reservation method in response, said connection request message comprising addresses of said leaf nodes and characteristics of downstream traffic in order to characterize the quality of service desired for a downstream data flow to transmit to said leaf nodes, said reservation message comprising a label for establishing a downstream MPLS connection. To bidirectionally establish the MPLS connection tree (15, 16, 17), the connection request message further comprises characteristics of upstream traffic in order in order to characterize the quality of service desired for upstream data flows to be received from said leaf nodes and a label for establishing an upstream MPLS connection.

18 Claims, 5 Drawing Sheets

| RESOURCES FOR THE UPSTREAM CONNECTION | REVERSE STYLE = FIXED | REVERSE STYLE = PROPORTIONAL |
|---|---|---|
| COMMON DESCRIPTOR U_TSPEC=1 | 1 | 2 x 1 = 2 |
| LEAF-SPECIFIC DESCRIPTOR A: U_TSPEC = 1 B: U_TSPEC = 3 | MAX(1,3) = 3 | 1+3 = 4 |

FIG_1
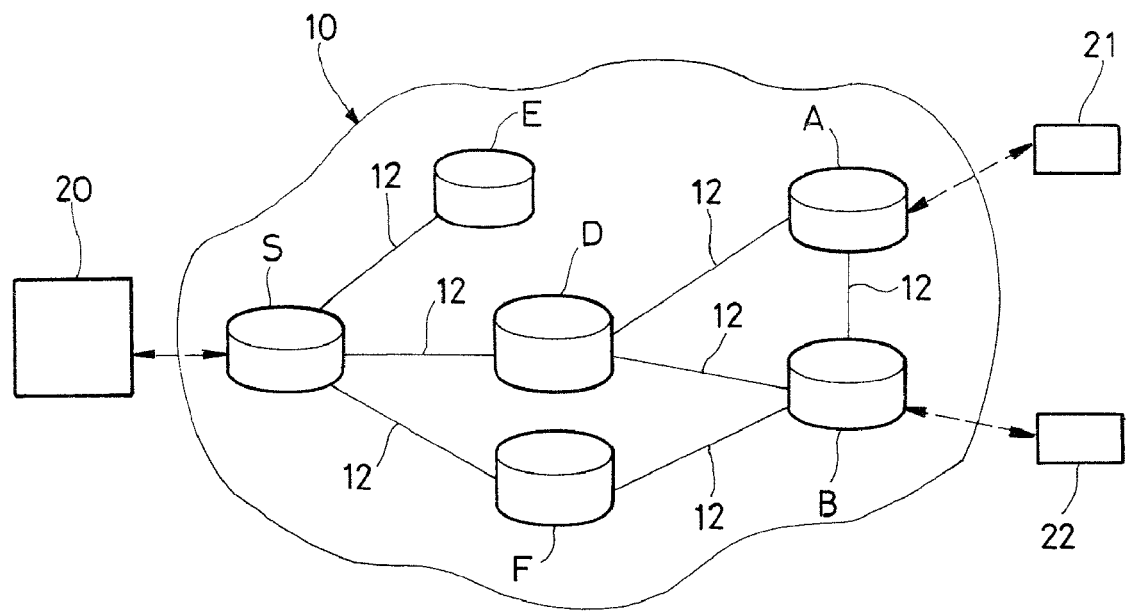
FIG_2
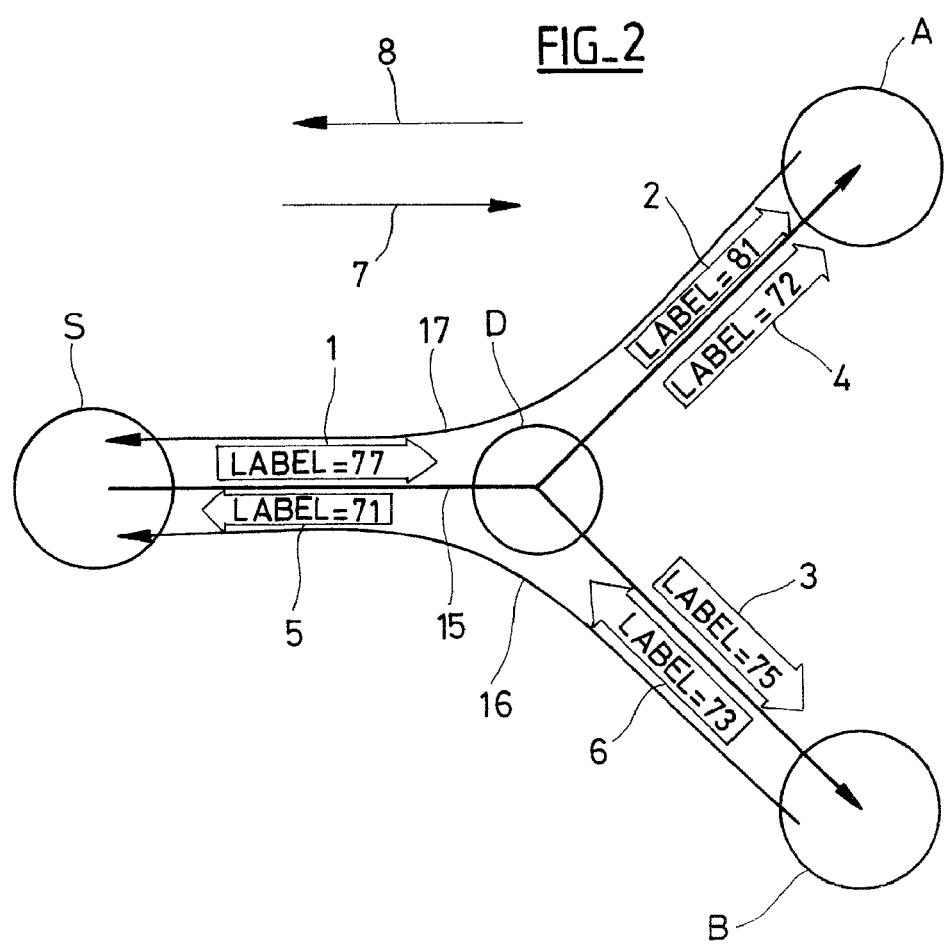

FIG_3
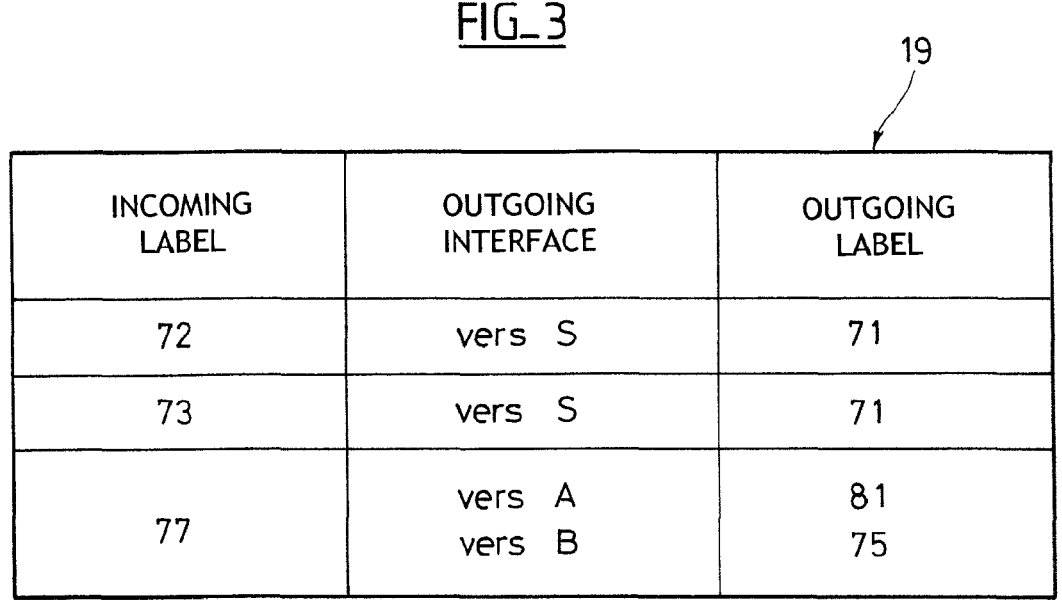
FIG_4
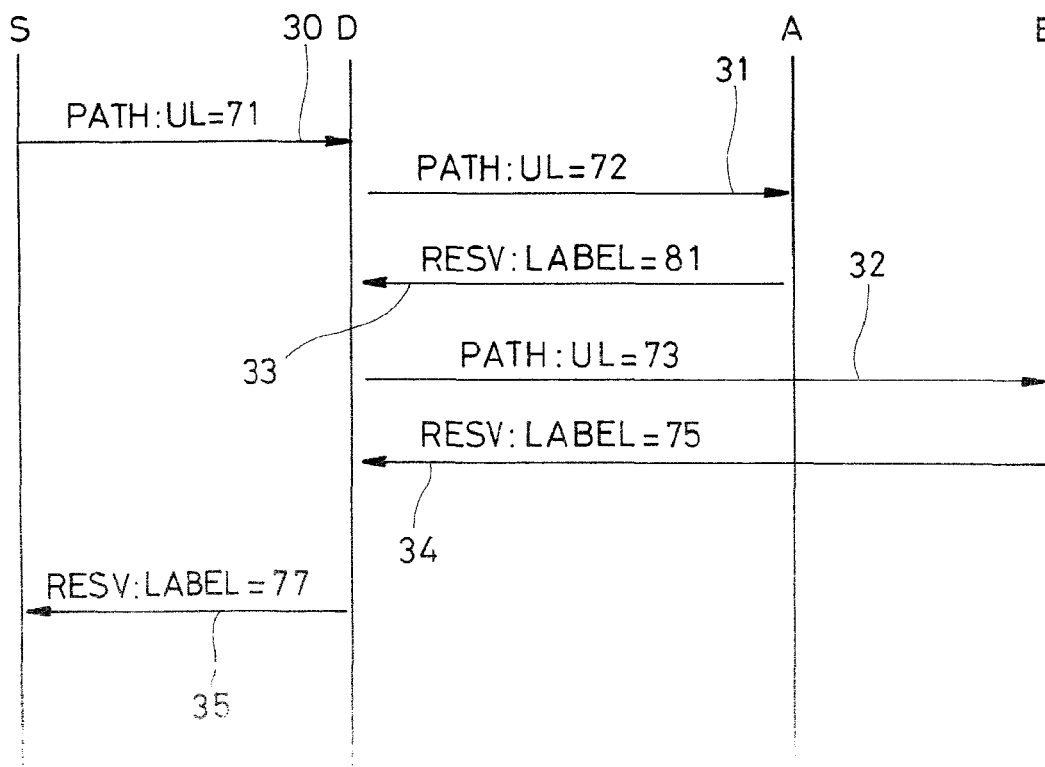

```
<Path Message> ::=       <Common Header> [ <INTEGRITY> ]
                         [ [<MESSAGE_ID_ACK> | <MESSAGE_ID_NACK>] ... ]
                         [ <MESSAGE_ID> ]
                         <SESSION> <RSVP_HOP>
                         <TIME_VALUES>
                         [ <EXPLICIT_ROUTE> ]
                         <LABEL_REQUEST>
                         [ <PROTECTION> ]
                         [ <LABEL_SET> ... ]
                         [ <SESSION_ATTRIBUTE> ]
                         [ <NOTIFY_REQUEST> ]
                         [ <ADMIN_STATUS> ]
                         [ <POLICY_DATA> ... ]
                         <REVERSE STYLE>
                         <sender descriptor>
                         <S2L sub-LSP descriptor list>

<sender descriptor> ::=  <SENDER_TEMPLATE>
                         <SENDER_TSPEC>
                         [ <U_TSPEC> ]
                         [ <ADSPEC> ] [ <U_ADSPEC> ]
                         [ <RECORD_ROUTE> ]
                         [ <SUGGESTED_LABEL> ]
                         [ <RECOVERY_LABEL> ]
                         <UPSTREAM_LABEL>

<S2L sub-LSP descriptor list> ::= <S2L sub-LSP descriptor>
                                  [ <S2L sub-LSP descriptor list> ]

<S2L sub-LSP descriptor> ::= <S2L_SUB_LSP> [ <U_TSPEC> ]
                             [ <P2MP SECONDARY_EXPLICIT_ROUTE> ]
```

FIG. 5

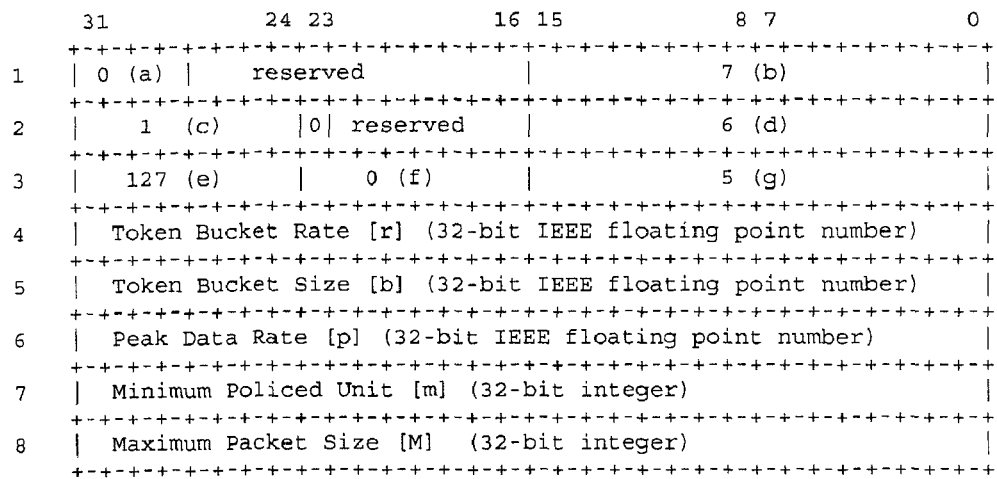

FIG. 6

```
<Resv Message> ::=      <Common Header> [ <INTEGRITY> ]
                        [ [<MESSAGE_ID_ACK> | <MESSAGE_ID_NACK>] ... ]
                        [ <MESSAGE_ID> ]
                        <SESSION> <RSVP_HOP>
                        <TIME_VALUES>
                        [ <RESV_CONFIRM> ] [ <SCOPE> ]
                        [ <NOTIFY_REQUEST> ]
                        [ <ADMIN_STATUS> ]
                        [ <POLICY_DATA> ... ]
                        <STYLE> <flow descriptor list>

<flow descriptor list> ::= <FF flow descriptor list>|<SE flow descriptor>

<SE flow descriptor> ::= <FLOWSPEC> [ <U_FLOWSPEC> ]<SE filter spec list>

<SE filter spec list> ::= <SE filter spec> | <SE filter spec list>
                          <SE filter spec>

<SE filter spec> ::=    <FILTER_SPEC> <LABEL> [ <RECORD_ROUTE> ]
                        <S2L sub-LSP flow descriptor list>

<FF flow descriptor list> ::= <FF flow descriptor>|<FF flow descriptor list>
                              <FF flow descriptor>

<FF flow descriptor> ::= [ <FLOWSPEC> ] [ <U_FLOWSPEC> ] <FILTER_SPEC>
                         <LABEL> [ <RECORD_ROUTE> ]
                         <S2L sub-LSP flow descriptor list>

<S2L sub-LSP flow descriptor list> ::=
                         <S2L sub-LSP flow descriptor>
                         [ <S2L sub-LSP flow descriptor list> ]

<S2L sub-LSP flow descriptor> ::= <S2L_SUB_LSP>
                                  [ <P2MP_SECONDARY_RECORD_ROUTE> ]
```

FIG. 7

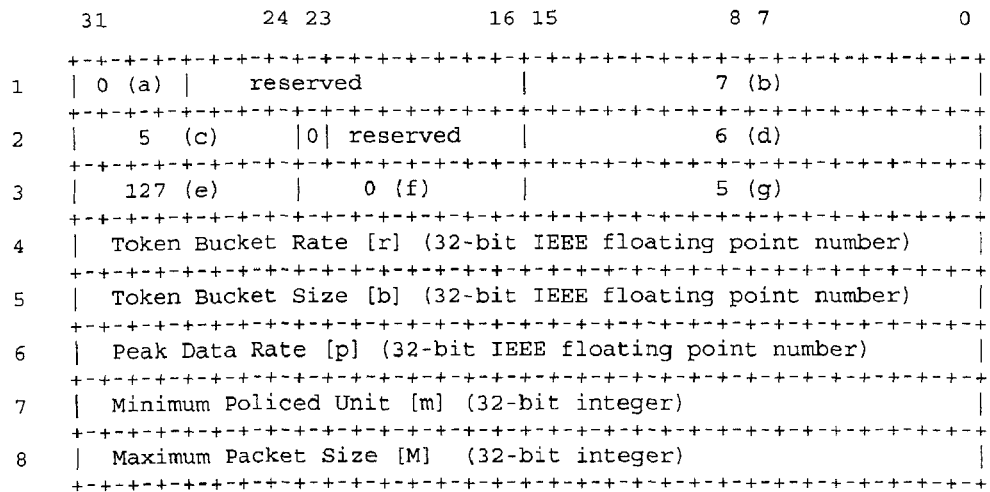

FIG. 8

FIG_9
| RESOURCES FOR THE UPSTREAM CONNECTION | REVERSE STYLE = FIXED | REVERSE STYLE = PROPORTIONAL |
|---|---|---|
| COMMON DESCRIPTOR<br>U_TSPEC = 1 | 1 | 2 × 1 = 2 |
| LEAF-SPECIFIC DESCRIPTOR<br>A: U_TSPEC = 1<br>B: U_TSPEC = 3 | MAX(1,3) = 3 | 1 + 3 = 4 |
FIG_10
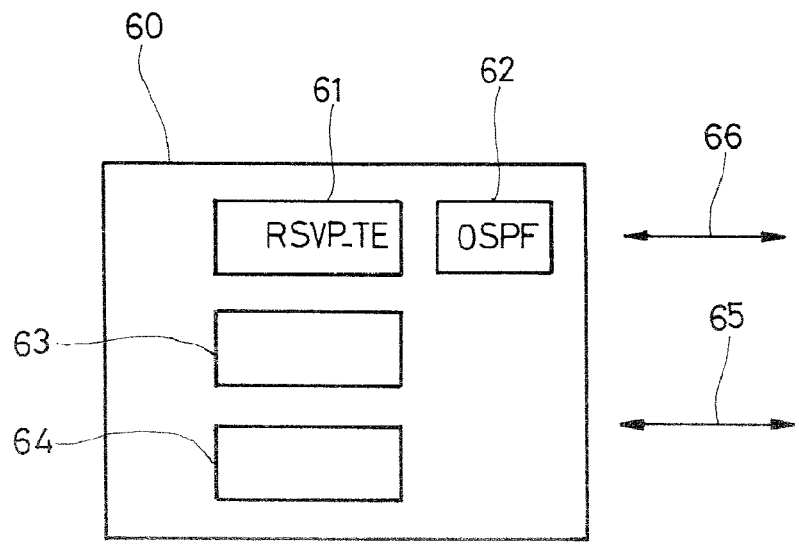

METHOD FOR ESTABLISHING A BIDIRECTIONAL POINT-TO-POINT CONNECTION

The invention pertains to the field of packet-switching networks.

The label-switching techniques known as MPLS (Multi Protocol Label Switching), and their developments known as GMPLS and TMPLS, make it possible to create logical connections within packet-switching networks in order to control the quality of service. Within this description, for simplicity's sake, the term MPLS will be used to denote all of these techniques. An MPLS connection is commonly known as an LSP (Label Switched Path).

RFC 4875, published by the IETF describes the extensions of the RSVP-TE (Resource Reservation Protocol-Traffic Engineering) protocol for establishing point-to-multipoint MPLS connection trees. This technique relies on RSVP-TE without requiring any multipoint routing techniques. Such connection trees may be used to distribute multicast services, such as television over IP, among others. However, most applications require an upstream channel from the service receivers to the source in order to control the application. One way of creating this upstream channel would be to separately establish point-to-point MPLS connections between each receiver and the source. In such a case, the control plan must manage multiple signaling sessions in order to establish and maintain these connections. Additionally, the availability status of the resources within a node may change between these separate establishment procedures, which creates drawbacks such as the risk of finding out that a node's resources are insufficient only at a late stage in the establishment procedures.

One purpose of the invention is to make it possible to establish an MPLS connection tree exhibiting bidirectional connectivity, particularly asymmetrical connectivity. Another purpose of the invention is to use a simple and reliable method to perform this establishment.

To do so, the invention discloses a communication device for an MPLS network, comprising:
a signaling module for establishing MPLS connections within said network and a resource management module for allocating transfer resources to said connections, said signaling module being capable of establishing a point-to-multipoint MPLS connection tree with a plurality of leaf nodes of said network by transmitting a connection request message to said leaf nodes and by receiving a reservation message in response to said connection request message, said connection request message comprising addresses of said leaf nodes and characteristics of downstream traffic for characterizing the quality of service desired for a downstream data flow to be transmitted to said leaf nodes, said reservation message comprising a label for establishing a downstream MPLS connection,
characterized in that, to bidirectionally establish the MPLS connection tree (15, 16, 17), the connection request message further comprises characteristics of upstream traffic for characterizing the quality of service desired for upstream data flows to be received from said leaf nodes and a label for establishing an upstream MPLS connection.

Such a communication device is suitable, for example, for creating a source node of the MPLS connection tree. In particular embodiments, this communication device exhibits one or more of the following characteristics:

the upstream traffic characteristics comprise at least one shared traffic characteristic associated with all the designated leaf nodes within the connection request message.

the upstream traffic characteristics comprise multiple distinct traffic characteristics respectively associated with multiple designated distinct leaf nodes within the connection request message.

the resource management module is capable of applying an upstream connection merge rule to determine a quantity of transfer resources allocated to the upstream MPLS connection as a function of the upstream traffic characteristics associated with said leaf nodes.

the signaling module is capable of inserting a reservation style indicator into said connection request message, indicating the merge rule applied by said resource management module.

the resource management module is capable of selectively applying multiple upstream flow merge rules.

the merge rule of the upstream connections may, in particular, be an upstream flow mutual exclusion rule, or an upstream flow additive rule.

Here, the term "flow mutual exclusion rule" denotes a resource calculation rule founded on the notion that the upstream flows of two distinct leaf nodes are never sent simultaneously within the network. It is therefore sufficient to allocate transfer resources to the upstream connection in a quantity sufficient to transfer the upstream flow of one of the leaf nodes, i.e. to meet the quality of service criteria of the most demanding upstream flow among those which may be received by the communication device. Contrariwise, a "flow additive rule" denotes a resource calculation rule founded on the notion that the upstream flows of multiple distinct leaf nodes are transmitted simultaneously within the network. This notion therefore involves allocating transfer resources to the upstream connection in a quantity sufficient to transfer the upstream flows that may be received by the communication device from all of the leaf nodes at the same time. Other possibilities exist for upstream flow merge rules, such as partial additive rules founded on the notions of statistically multiplexing the upstream flows of multiple leaf nodes.

The invention also discloses a method for creating a bidirectional point-to-multipoint connection tree between a source node and leaf nodes within an MPLS network, said method comprising steps consisting of:
receiving, at a switching node, a connection request message including destination addresses identifying leaf nodes, downstream traffic characteristics for characterizing the desired quality of service for a downstream data flow to be transmitted to said leaf nodes, upstream traffic characteristics for characterizing the quality of service desired for the upstream data flows to be received from said leaf nodes, and a label for establishing an upstream MPLS connection to the source node,
determining a quantity of transfer resources allocated to said upstream MPLS connection depending on said upstream traffic characteristics and an upstream connection merge rule,
determining the downstream interfaces of said switching node for communicating with said leaf nodes,
at each of said downstream interfaces, transmitting a connection request message including at least one destination address identifying at least one leaf node accessible through said downstream interface, said downstream traffic characteristics, the upstream traffic characteristics for characterizing the quality of service desired for the upstream data flows to be received from said at least one leaf node, and a label for establishing an upstream MPLS connection to said switching node, at said downstream interfaces, receiving reservation messages including labels for establishing downstream MPLS connections to said leaf nodes, transmitting to said source node a reservation message including a label for establishing a downstream MPLS connection to said switching node, creating an association between the downstream MPLS connection labels and an association between the upstream MPLS connection labels within a switching table of said switching node.

Such an establishment method may, for example, be implemented within one or more branch nodes of the connection tree. In particular embodiments, this establishment method exhibits one or more of the following characteristics:

it comprises the step consisting of selecting said upstream connection merge rule based on a reservation style indicator contained within said received connection request message.

it comprises the step consisting of retransmitting said reservation style indicator within connection request messages on said downstream interfaces.

the upstream connection merge rule is selected from a set comprising an upstream flow mutual exclusion rule and an upstream flow additive rule.

the reservation messages received by the switching node comprise upstream traffic characteristics, such as within U_FLOWSPEC objects, for characterizing the quality of service desired for upstream data flows to be received from said leaf nodes and the reservation message transmitted by the switching node comprises upstream traffic characteristics, such as within a U_FLOWSPEC object, resulting from the application of said merge rule.

The invention also discloses a switching node for an MPLS network, comprising a signaling module for establishing MPLS connections within said network and a resource management module for allocating transfer resources to said connections, said signaling module being capable of establishing a point-to-multipoint MPLS connection tree with a plurality of leaf nodes by performing steps consisting of:

receiving a connection request message from an upstream node, said message comprising destination addresses identifying leaf nodes and downstream traffic characteristics for characterizing the quality of service desired for a downstream data flow to be transmitted to said leaf nodes, transmitting connection request messages to said leaf nodes, said messages comprising said destination addresses and said downstream traffic characteristics, in reply to said connection request messages, receiving reservation messages comprising labels for establishing downstream MPLS connections to said leaf nodes, transmitting to said upstream node a reservation message including a label for establishing a downstream MPLS connection to said switching node, and creating an association between the labels of the downstream MPLS connections within a switching table of said switching node, characterized in that, to establish said MPLS connection tree bidirectionally, said signaling module is capable of establishing an upstream MPLS connection with said upstream node using a label received within said connection request message, and that said resource management module is capable of determining a quantity of transfer resources allocated to said upstream MPLS connection as a function of an upstream connection merge rule and upstream traffic characteristics received within said connection request message, said signaling module being capable of transmitting, within said connection request messages, said upstream traffic characteristics and labels for establishing upstream MPLS connections to said switching node, and capable of creating an association between the labels of the upstream MPLS connections within said switching table.

Such a communication node is suitable, for example, for creating a branch node of the MPLS connection tree. In particular embodiments, this communication node exhibits one or more of the following characteristics:

the resource management module is capable of selecting said upstream connection merge rule as a function of a reservation style indicator contained within said received connection request message.

the signaling module is capable of retransmitting said reservation style indicator within said connection request messages.

the upstream connection merge rule is selected from a set comprising an upstream flow mutual exclusion rule and an upstream flow additive rule.

the resource management module is capable of allocating a quantity of transfer resources to an upstream MPLS connection originating from at least one leaf node, said quantity corresponding to the upstream traffic characteristics associated with said at least one leaf node found within said connection request message received by the switching node.

the signaling module is capable of transmitting a reservation message to the upstream node, said message comprising upstream traffic characteristics resulting from the application of said merge rule.

One idea at the basis of the invention is to establish, within a single signaling session, a point-to-multipoint MPLS connection tree and a multipoint-to-point MPLS connection tree utilizing the same routes in the opposite direction, so as to offer bidirectional connectivity between a source node and leaf nodes, particularly with asymmetrical traffic characteristics, and to be able to easily manage these MPLS connections as a single logical entity of the control plan. Another idea at the basis of the invention is to establish these MPLS connections by means of a single exchange of signaling messages between the source node and the leaf nodes, so as to be able to perform the admissions control for both the upstream the and downstream connections approximately simultaneously.

The invention will be better understood, and other purposes, details, characteristics, and advantages thereof will become more clearly apparent, in the following description of multiple particular embodiments of the invention, which are given only by way of illustrative and non-limiting examples, with reference to the attached drawings. In these drawings:

FIG. 1 schematically depicts one embodiment of an MPLS network wherein the invention may be implemented.

FIG. 2 schematically depicts one embodiment of a bidirectional point-to-multipoint connection tree established within the network of FIG. 1.

FIG. 3 schematically depicts one switching table of a branch node in the connection tree of FIG. 2.

FIG. 4 schematically depicts one embodiment of a signaling method for establishing the connection tree of FIG. 2.

FIG. 5 is a summary depiction of a connection request message used in the method of FIG. 3.

FIG. 6 is an example of a traffic descriptor used within the message of FIG. 5.

FIG. 7 is a summary depiction of a reservation message used in the method of FIG. 3.

FIG. 8 is an example of a traffic descriptor used within the message of FIG. 7.

FIG. 9 is a table illustrating multiple embodiments of a resource reservation for an upstream connection within the connection tree of FIG. 2.

FIG. 10 schematically depicts an embodiment of an MPLS router that may be used in the network of FIG. 1.

FIG. 1, schematically depicts six nodes A, B, D, E, F, and S of a network 10 with an IP/MPLS control plan. In this example, the nodes A, B, D, E, F, and S are IP/MPLS routers. The reference 12 denotes the physical links between these nodes. The links 12 and physical interfaces between the nodes may be of any nature whatsoever. The network may be of any topology and scope whatsoever; in particular, the number of nodes may be greater than shown in FIG. 1.

By way of example, the establishment of a bidirectional point-to-multipoint connection tree between the nodes S, A, and B will be described. This establishment may, for example, be requested by an application server 20 connected to the node S which needs to both distribute a data flow to the client applications 21 and 22 connected to nodes A and B, and to be capable of receiving data flows from the client applications 21 and 22. This establishment may also be requested by a network management system. It is assumed that the results of a route calculation are the route S-D-A for connecting the application 20 to the client 21, and the route S-D-B for connecting the application 20 to the client 22. This route calculation is performed prior to the signaling phase and/or during the signaling phase, by routing methods that will not be described here. In the first situation, the connection request messages are explicitly routed. In the second situation, the connection request messages are routed hop-by-hop.

As a reminder, an MPLS connection comprises a sequence of one or more component connections identified each time by a label having an agreed local value between two adjacent nodes. A switching node recognizes that a packet belongs to a connection by means of a corresponding label placed within a packet header. The nodes have switching tables making it possible to find, for each incoming label, the output interface and the label to place into the packet header, in such a way that the packets may be routed without reading the IP headers.

FIG. 2 schematically depicts the bidirectional point-to-multipoint connection tree established between the nodes S, A, and B. The direction indicated by the arrow 7 running from the node S to the nodes A and B will be called "downstream", and the direction indicated by the arrow 8 running from the node A or B to the node S will be called "upstream". Under the normal conventions of the RSVP protocol, "upstream" corresponds to the node sending a connection request message and "downstream" corresponds to the recipient of the message, which is also the sender of a reservation message. The bidirectional point-to-multipoint connection tree comprises a downstream point-to-multipoint connection 15 between the node S, which is the source node, and the nodes A and B, which are the leaf nodes, as well as an upstream multipoint-to-point connection between the leaf nodes A and B and the source node S. The downstream point-to-multipoint connection 15 comprises the component connection 1 between S and D, the component connection 2 between D and A, and the component connection 3 between D and B. The node D is a branch node of the point-to-multipoint connection. It ensures that incoming packets are replicated by the component connection 1 to the component connections 2 and 3. The upstream multipoint-to-point connection appears as a plurality of point-to-point connections that are merged in their shared portion. The upstream point-to-point connection 17 between the leaf node A and the source node S comprises the component connection 4 between A and D and the component connection 5 between D and S. The upstream point-to-point connection 16 between the leaf node B and the source node S comprises the component connection 6 between B and D and the component connection 5 between D and S. In this manner, upstream of the branch node D, the connections 16 and 17 are merged, in such a way that resources are jointly reserved for the upstream flows of both leaf nodes A and B. The topology depicted has been chosen to be very simple for the sake of clarity. Naturally, other connection tree structures may be constructed analogously, particularly having multiple branch nodes.

In FIG. 2, for illustrative purposes, the values of the labels identifying each component connection have been indicated. FIG. 3 depicts the contents of a corresponding switching table 19 used in the branch node D. Only one switching table has been depicted for node for simplicity's sake, but there are multiple ways of organizing the switching data of a node, in one or more data structures. For example, one switching table may be provided for each incoming interface of the node.

In one embodiment, the bidirectional connection tree of FIG. 2 is established using the signaling protocol RSVP-TE. FIG. 4 depicts the transfers of signaling messages that enable this establishment. These messages comprise connection request messages, known as PATH in RSVP-TE, and reservation messages, known as RESV in RSVP-TE. Under the normal operating rules of the RSVP-TE protocol, each node selects the labels identifying the node's incoming connections, and causes the labels identifying the node's outgoing connections to be communicated by the neighboring nodes. Compared to the known technique for establishing a downstream point-to-multipoint connection with RSVP-TE, the same number of signaling messages is exchanged. Here, the contents of these messages are modified to simultaneously enable the establishment of upstream connections from the leaf nodes to the source node. All of these signaling messages are exchanged within a single RSVP-TE session, and therefore comprise shared session identifiers, which makes it possible to create a logical association between the connections 15, 16, and 17 that make up the bidirectional connection tree. As a result, the network's control plan is able to manage the bidirectional connection tree as a single entity, which facilitates operations such as error detection, re-routing, and restoring or resizing reservations.

FIG. 10 depicts an example working architecture of an MPLS or GMPLS switch for creating nodes A, B, D, and S. The switch 60 comprises a signaling controller 61 and a routing controller 62 communicating with the other network elements via control channels 66. The signaling controller 61 receives and transmits signaling messages to establish connections with other network elements. A traffic transfer unit 64 communicates with the other network elements via data channels 65. The traffic transfer unit 64 is in charge of transferring the data packets based on the labels. The data channels 65 and control channels 66 may be constructed on shared or separate interfaces. A resource management controller 63 reserves and allocates transfer resources to the connections, based on their availability. In particular, it fulfills the functions of admissions control and policy control.

Now, the exchanging of PATH and RESV messages will be described more precisely. The quality of service characteristics of the downstream and upstream connections to be established were previously communicated to the source node S. These characteristics are treated independently in both directions, and may therefore be identical for establishing symmetrical connections, or different for establishing asymmetrical connections. These characteristics may, for example, be specified by the application server 20, or by the network management system that is requesting the connection. Based on these characteristics, the source node S forms a SENDER_TSPEC object that is a traffic descriptor for the downstream flow, and one or more U_TSPEC objects, which are traffic descriptors for the upstream flows. These traffic descriptors constitute a characterization, on a more or less detailed level, of the quality of service required for the connection tree. The source node S transmits a PATH message 30, comprising, among other things, these objects, to the next hop; here, the node D.

FIG. 5 gives an example of a format that may be used for the PATH message. The brackets designate optional objects. Outside of the REVERSE_STYLE, U_TSPEC, U_ADSPEC, and UPSTREAM_LABEL objects, this format corresponds to RFC 4875. In particular, the addresses of the leaf nodes are indicated in the S2L_SUB_LSP objects. The objects ADSPEC and U_ADSPEC are connection path descriptors that are established and updated by the nodes processing the PATH message, in order to specify characteristics of the elements that make up the connection path, as explained in RFC 2210. Here, the object ADSPEC is dedicated to the characteristics of the downstream connection paths, and the object U_ADSPEC is dedicated to the characteristics of the upstream connection paths. The object UPSTREAM_LABEL serves to indicate to the next hop which label must be used for the upstream connection.

FIG. 3 gives an example of a format that may be used for the objects SENDER_TSPEC and U_TSPEC. This format corresponds to a packet network, wherein the quality of service is controlled as defined by RFC 2210. The content of the traffic descriptors depends upon the nature of the network's lower levels. Other traffic parameters may be used, depending on the options offered by the network. For example, RFC 4606 defines traffic parameters for a SONET/SDH physical layer. The proposal "MEF Ethernet Traffic Parameters", submitted by Papadimitriou to the IETF in June 2007, defines traffic parameters for an Ethernet network.

Given that the downstream connection pertains to data flows distributed by the source node S to all the leaf nodes, a single traffic descriptor SENDER_TSPEC is sufficient for characterizing the quality of service required on all of the downstream component connections. On the other hand, multiple options exist for characterizing the quality of service in the upstream direction.

A first option assumes that all the leaf nodes have the same quality of service needs in the upstream direction. In such a case, a single traffic descriptor, U_TSPEC, is sufficient in PATH messages. This object is then common to all the leaf nodes. It may be placed directly in the sender descriptor object, as indicated in FIG. 5.

A second option assumes that each leaf node has its own quality of service needs in the upstream direction. In such a case, the PATH message must contain a U_TSPEC traffic descriptor for each leaf node to which it is being sent. These objects may be placed within S2L sub-LSP descriptor objects, as indicated in FIG. 5. In both cases, a U_TSPEC traffic descriptor characterizes a single upstream connection.

When the signaling controller of the branch node D receives the PATH message, it processes its content using the known technique whenever the downstream connection is concerned. In particular, the SENDER_TSPEC traffic descriptor is processed by the resource management controller for pre-reserving transfer resources in the downstream direction. If the necessary resources are unavailable, an error message is sent.

Furthermore, the branch node D is also a merge node whenever upstream connections are concerned. The upstream connection of the node A and the upstream connection of the node B are merged beginning with node D. The node D establishes only one upstream connection 5 to the source node, with the assistance of the label that it receives in the UPSTREAM_LABEL object. To determine the quality of service characteristics, and therefore the resources that must be allocated to the upstream connection 5, the resource management controller processes the U_TSPEC object(s) by applying an upstream connection merge rule. This rule defines the manner in which the U_TSPEC traffic descriptors associated with each leaf node must be merged. This rule may be set by configuration. In one preferred embodiment, this rule is selected by the branch node D as a function of the content of the REVERSE_STYLE object. Depending on the value of this object, the resource management controller selects one merge rule or another.

In one preferred embodiment, the REVERSE_STYLE object may assume two values, a FIXED value designating a mutual exclusion of the upstream flows and a PROPORTIONAL value designating an addition of the upstream flows. The table in FIG. 9 illustrates the application of these merge rules in one particular example. For simplicity's sake, here the traffic descriptor U_TSPEC comprises only one parameter, expressed in an arbitrary unit, which is assumed to be additive. The line 40 represents the situation for a shared traffic descriptor associated with the leaf nodes A and B, and the line 41 represents the situation for particular traffic descriptors. Examples of additive parameters are the "token bucket rate", "token bucket size", and "peak data rate" parameters in FIG. 6.

In practice, not all traffic parameters are additive. More generally, if REVERSE_STYLE=FIXED, the resource management controller determines which traffic parameters make it possible to strictly offer the quality of service required for each upstream flow, on the assumption that no two leaf nodes are transmitting simultaneously. To use imprecise language, the resource management controller determines the "lowest higher node" for all of the U_TSPEC traffic descriptors, where the terms "low" and "high" refer to quality of service levels. For the "Maximum Packet Size" parameter, the higher node is the maximum value. For the "Minimum Policed Unit" parameter, the higher node is the minimum value.

If REVERSE_STYLE=PROPORTIONAL, the resource management controller determines which traffic parameters make it possible to strictly offer the quality of service required for each upstream flow, on the assumption that all leaf nodes are transmitting simultaneously.

In particular, combining a traffic descriptor common to all the leaf nodes and a FIXED reservation style is equivalent to reserving the same bandwidth for all the upstream connections of the tree.

After this determination has been made, the resource management controller of the node D reserves the transfer resources in the upstream direction. If the necessary resources are unavailable, an error message is sent.

Next, the signaling controller of the node D sends connection request messages 31 to the node A, and 32 to the node B. The SENDER_TSPEC and U_TSPEC traffic descriptors have passed through unchanged. However, the S2L sub-LSP descriptor objects have passed through only when traveling towards the leaf nodes that they concern. In each PATH message, the UPSTREAM_LABEL object is updated by the node D to specify which label is to be used by the next node for the upstream connection.

The processing described above for the node D may be repeated within multiple successive branch nodes, if need be. Finally, each leaf node receives a PATH message, potentially after intermediate hops not shown here.

Upon receiving the message 31, the resource management controller processes the SENDER_TSPEC and U_TSPEC traffic descriptors to check whether the resources of the node A are sufficient to establish the upstream connection and the downstream connection with the characteristics specified by the traffic descriptors. If the necessary resources are unavailable, an error message is sent. Otherwise, the resource management controller reserves these resources for the connections 15 and 17. The leaf node A establishes the upstream connection 4 to the node D, with the assistance of the label that it receives within the UPSTREAM_LABEL object, and it transmits a reservation message 33 to the node D. The leaf node B performs the same processing and transmits a reservation message 34 to the node D. The reservation messages serve, in particular, to indicate which labels to use for the downstream connection. FIG. 4 indicates the values of the labels transported by the signaling messages, which correspond to the example of FIGS. 2 and 3. "UL" stands for UPSTREAM_LABEL.

FIG. 7 gives an example of a format that may be used for the RESV message. Outside of the option object U_FLOWSPEC, this format corresponds to RFC 4875. FIG. 8 gives an example of a format that may be used for the FLOWSPEC and U_FLOWSPEC objects. This format corresponds to a packet network, wherein the quality of service is controlled as defined by RFC 2210.

The FLOWSPEC object is a traffic descriptor for the downstream flow, and the U_FLOWSPEC object is a traffic descriptor for the upstream flow. These traffic descriptors constitute a characterization of the resources that the leaf node has assigned to the connection in both directions. These traffic descriptors may coincide with the values of parameters contained within the SENDER_TSPEC and U_TSPEC objects, or may be different. In particular, they may specify traffic parameters with lower levels than those initially requested by the source node, such as in terms of data rate.

If the object U_FLOWSPEC is not used, the RESV messages 33, 34, and 35 pertain only to the downstream point-to-multipoint connection, and are processed using the known technique. With each hop, the signaling controller updates the switching tables as a function of the labels received. The FLOWSPEC traffic descriptor has moved to the resource management controller of the node, which ends the reservation of resources for the downstream connection.

In the embodiment described above, the nodes reserve resources for upstream connections by processing the connection request message. In one variant embodiment, the nodes pre-reserve the resources for the upstream connections by processing the connection request message, and the U_FLOWSPEC object is used in reservation messages to confirm the resource reservations that are to be made. In such a case, whenever the branch node D has received the reservation messages 33 and 24, the U_FLOWSPEC traffic descriptors coming from the leaf nodes A and B have moved on to the resource management controller. The resource management controller applies the previously described upstream connection merge rule to these objects in order to determine which resources to reserve for the upstream connection. Next, the resource management controller terminates the resource reservation. A U_FLOWSPEC traffic descriptor resulting from this merger moves upstream within the reservation message 35.

In the signaling steps described below, with reference to FIG. 4, it may be necessary to distribute signaling information in multiple messages so as not to exceed the maximum size of the messages. Each signaling message shown may therefore, in reality, correspond to the sending of multiple complementary messages.

In the known technique, the signaling controller of the source node S is also in charge of sending periodic refresh messages to the leaf nodes in order to maintain the resource reservation.

The bidirectional nature of the connection establishment request is signified by the presence of the UPSTREAM_LABEL object in the PATH message. If the UPSTREAM_LABEL object is absent from the PATH message, the nodes may process the connection request as a unidirectional request, and not take into account any U_TSPEC or REVERSE_STYLE objects found therein. To create the connection tree symmetrically, it is not necessary to use a separate traffic descriptor for upstream connections. In one embodiment, whenever the UPSTREAM_LABEL object is present but the U_TSPEC object is not, the nodes interpret the SENDER_TSPEC object as a traffic descriptor pertaining to both the downstream connection and the upstream connection.

The objects contained within the signaling messages are formed using one or more predefined formats that are readable by the other nodes of the MPLS domain. Naturally, the formats and names of the variables used in the present description are purely illustrative. These names and formats may follow different conventions. Preferably, the names and formats are chosen in such a way as to offer backward compatibility with already-established standards.

The data exchanges within the networks are frequently asymmetrical. The methods described above make it possible to meet asymmetrical bandwidth demands. They may be applied to all network segments (access, metropolitan, and core) and enable particularly significant optimizations in critical areas close to end users, such as access segments, where traffic is often highly asymmetrical. By way of example, broadcast television services and video-on-demand generate highly asymmetrical feeds over these segments. The downstream flows are made up of video data send to the users, whereas the upstream flows are essentially made up of control messages associated with the service (a film request, changing channels, etc.) The upstream connections may also be used for the network's operation, administration, and maintenance (OAM) functionalities.

The methods described above rely on the RSVP-TE protocol. However, they may be implemented with other signaling protocols exhibiting equivalent functionalities.

Some of the described elements, in particular the signaling, routing, and resource management controllers, may be embodied in different forms, in a unitary or distributed manner, by means of hardware and/or software components. Hardware components that may be used are application-specific integrated circuits, field-programmable gate arrays, or microprocessors. Software components may be written in multiple programming languages, such as C, C++, Java or VHDL. This list is not exhaustive. Multiple controllers may be represented by a single hardware element.

A network management system may be a hardware device, such as a microcomputer, a workstation, a device connected to the Internet, or any other communication device, whether dedicated or general-purpose. Software programs executed by this system fulfill the network management functions for controlling network elements.

Transfer resources generally encompass all physical or logical elements that may be mobilized by the network in order to transfer traffic. Depending on the nature of the physical layers and media access control layers in the nodes, the communication resources may particularly designate elements such as CPU clock, memory space, registries, logical or physical ports, radio or optic channels, intervals of time, and other elements.

Although the invention was described in connection with multiple particular embodiments, it is quite obvious that it is not in any way limited thereto, and that it comprises all technical equivalents of the means described, as well as all combinations thereof, if said combinations fall within the scope of the invention.

The usage of the verbs "comprise" or "include" and their conjugated forms does not rule out the presence of steps or elements other than those described in a claim. Unless otherwise specified, the usage of the indefinite article "a" or "an" for an element or step does not rule out the presence of a plurality of such elements or steps.

In all claims, any reference digits found within parentheses shall not be interpreted as limiting the claim.

The invention claimed is:

1. A communication device for a multi protocol label switching (MPLS) network, comprising:
    a signaling module for establishing MPLS connections within MPLS said network and a resource management module for allocating transfer resources to said MPLS connections, said signaling module being capable of establishing a point-to-multipoint MPLS connection tree with a plurality of leaf nodes of said network by transmitting a connection request message to said leaf nodes and by receiving a reservation message in response to said connection request message, said connection request message comprising addresses of said leaf nodes and characteristics of downstream traffic for characterizing the desired quality of service for a downstream data flow to be transmitted to said leaf nodes, said reservation message comprising a label for establishing a downstream point-to-multipoint MPLS connection,
    characterized in that, to bidirectionally establish the point-to-multipoint MPLS connection tree, the connection request message further comprises characteristics of upstream traffic in order to characterize the quality of service desired for upstream data flows to be received from said leaf nodes and a label for establishing an upstream multipoint-to-point MPLS connection,
    wherein said reservation message is received before said downstream point-to-multipoint MPLS connection is established,
    wherein the communication device is a branch node of the downstream point-to-multipoint MPLS connection and a merge node of the upstream multipoint-to-point MPLS connection,
    wherein the upstream multipoint-to-point MPLS connection comprises a plurality of upstream component connections from a plurality of the leaf nodes that are merged at the communication device,
    wherein the resource management module is capable of applying an upstream connection merge rule in order to determine a quantity of transfer resources allocated to the upstream multipoint-to-point MPLS connection upstream of the branch node, the quantity of transfer resources being determined as a function of the upstream traffic characteristics associated with the leaf nodes by applying the upstream connection merge rule.

2. The communication device according to claim 1, characterized in that the upstream traffic characteristics comprise at least one common traffic characteristic associated with all the leaf nodes designated within the connection request message.

3. The communication device according to claim 1, characterized in that the upstream traffic characteristics comprise multiple distinct traffic characteristics respectively associated with multiple distinct leaf nodes designated within the connection request message.

4. The communication device according to claim 1, characterized in that the signaling module is capable of inserting within said connection request message a reservation style indicator indicating the upstream connection merge rule applied by said resource management module.

5. The communication device according to claim 1, characterized in that said resource management module is capable of selectively applying multiple upstream flow merge rules.

6. The communication device according to claim 1, characterized in that said upstream connection merge rule is an upstream flow mutual exclusion rule.

7. The communication device according to claim 1, characterized in that said upstream connection merge rule is an upstream flow additive rule.

8. A method for establishing a bidirectional point-to-multipoint connection tree between a source node and leaf nodes within a multi protocol label switching (MPLS) network, wherein the bidirectional point-to-multipoint connection tree comprises a downstream point-to-multipoint MPLS connection and an upstream multipoint-to-point MPLS connection, said method comprising steps consisting of:
    receiving, at a switching node which is a branch node of the downstream point-to-multipoint MPLS connection and a merge node of the upstream multipoint-to-point MPLS connection, a connection request message including destination addresses identifying leaf nodes, downstream traffic characteristics for characterizing the desired quality of service for a downstream data flow to be transmitted to said leaf nodes, upstream traffic characteristics for characterizing the quality of service desired for the upstream data flows to be received from said leaf nodes, and a label for establishing the upstream multipoint-to-point MPLS connection to the source node,
    determining a quantity of transfer resources allocated to said upstream multipoint-to-point MPLS connection upstream of the switching node depending on said upstream traffic characteristics and an upstream connection merge rule,
    determining the downstream interfaces of said switching node for communicating with said leaf nodes,
    at each of said downstream interfaces, transmitting a connection request message (31) including at least one destination address identifying at least one leaf node accessible through said downstream interface, said downstream traffic characteristics, and the upstream traffic characteristics for characterizing the quality of service desired for the upstream data flows to be received from said at least one leaf node, and a label for establishing the upstream multipoint-to-point MPLS connection to said switching node,
    at said downstream interfaces, receiving reservation messages including labels for establishing downstream MPLS connections to said leaf nodes, transmitting to said source node a reservation message including a label for establishing a downstream MPLS connection to said switching node, creating an association between the downstream MPLS connection labels and an association between the upstream MPLS connection labels within a switching table (19) of said switching node, wherein said transmitted reservation message is sent before said downstream point-to-multipoint MPLS connection is established.

9. The method according to claim 8, characterized in that the upstream traffic characteristics comprise at least one common traffic characteristic associated with all of the leaf nodes designated within the connection request message.

10. The method according to claim 8, characterized in that the upstream traffic characteristics comprise multiple distinct traffic characteristics respectively associated with multiple distinct leaf nodes designated within the connection request message.

11. The method according to claim 8, characterized by steps consisting of selecting said upstream connection merge rule as a function of a reservation style indicator contained within said received connection request message and of retransmitting said reservation style indicator within the connection request messages to said downstream interfaces.

12. The method according to claim 11, characterized in that said upstream connection merge rule is selected from a set comprising an upstream flow mutual exclusion rule and an upstream flow additive rule.

13. The method according to claim 8, wherein the reservation messages received by the switching node include upstream traffic characteristics for characterizing the quality of service desired for the upstream data flows to be received from said leaf nodes and the reservation message transmitted by the switching node includes upstream traffic characteristics resulting from the application of said merge rule.

14. A switching node for a multi protocol label switching (MPLS) network, comprising a signaling module for establishing MPLS connections within said network, and a resource management module for allocating transfer resources to said connections, said signaling module being capable of creating a point-to-multipoint MPLS connection tree with a plurality of leaf nodes by performing steps consisting of:

receiving a connection request message from an upstream node, said message comprising destination addresses identifying leaf nodes and downstream traffic characteristics for characterizing the quality of service desired for a downstream data flow to be transmitted to said leaf nodes, transmitting connection request messages including said destination addresses and said downstream traffic characteristics to said leaf nodes, in reply to said connection request messages, receiving reservation messages including labels for establishing downstream MPLS connections to said leaf nodes, transmitting to said upstream node a reservation message including a label for establishing a downstream MPLS connection to said switching node, and creating an association between the labels of the downstream MPLS connections within a switching table of said switching node, characterized in that, in order to bidirectionally establish said MPLS connection tree, said signaling module is capable of establishing an upstream multipoint-to-point MPLS connection with said upstream node using a label received within said connection request message, and that said resource management module is capable of determining a quantity of transfer resources allocated to said upstream multipoint-to-point MPLS connection upstream of the switching node as a function of an upstream connection merge rule and upstream traffic characteristics received within said connection request message, said signaling module being capable of transmitting, within said connection request messages, said upstream traffic characteristics and labels for establishing upstream MPLS connections to said switching node, and of creating an association between the MPLS connection labels within said switching table, wherein said reservation message is transmitted before said downstream MPLS connection is established.

15. A switching node according to claim 14, characterized in that said resource management module is capable of selecting said upstream connection merge rule as a function of a reservation style indicator contained within said received connection request message, and that said signaling module is capable of transmitting said reservation style indicator within said connection request messages.

16. A switching node according to claim 15, characterized in that said upstream connection merge rule is selected from among a set comprising an upstream flow mutual exclusion rule and an upstream flow additive rule.

17. A switching node according to claim 14, characterized in that said resource management module is capable of allocating a quantity of transfer resources to an upstream MPLS connection coming from at least one leaf node, said transfer resources corresponding to the upstream traffic characteristics associated with at least one leaf node within said connection request message received by the switching node.

18. A switching node according to claim 14, characterized in that the signaling module is capable of transmitting to the upstream node a reservation message including upstream traffic characteristics resulting from the application of said merge rule.

* * * * *